(12) United States Patent
Schaufele

(10) Patent No.: US 10,328,848 B1
(45) Date of Patent: Jun. 25, 2019

(54) TRAILER HITCH SIGNALING DEVICE

(71) Applicant: Joseph Schaufele, Dallastown, PA (US)

(72) Inventor: Joseph Schaufele, Dallastown, PA (US)

(*) Notice: Subject to any disclaimer, the term of this patent is extended or adjusted under 35 U.S.C. 154(b) by 0 days.

(21) Appl. No.: 15/926,048

(22) Filed: Mar. 20, 2018

(51) Int. Cl.
| | |
|---|---|
| *B60Q 1/34* | (2006.01) |
| *B60Q 1/26* | (2006.01) |
| *B60Q 1/44* | (2006.01) |
| *B60Q 1/36* | (2006.01) |
| *B60D 1/64* | (2006.01) |

(52) U.S. Cl.
CPC ............ *B60Q 1/2661* (2013.01); *B60D 1/64* (2013.01); *B60Q 1/36* (2013.01); *B60Q 1/44* (2013.01)

(58) Field of Classification Search
CPC .......... B60Q 1/2661; B60Q 1/36; B60Q 1/44; B06D 1/64
USPC .......................................................... 340/475
See application file for complete search history.

(56) References Cited

U.S. PATENT DOCUMENTS

| | | | |
|---|---|---|---|
| 4,738,293 A | 4/1988 | Ostrom | |
| 4,800,471 A * | 1/1989 | Lippert | B60Q 1/44 340/479 |
| 5,979,094 A * | 11/1999 | Brafford, Jr. | B60D 1/60 40/205 |
| 6,053,627 A * | 4/2000 | Vo | B60Q 1/305 362/485 |
| 6,102,424 A | 8/2000 | Cole, Jr. | |
| 6,197,390 B1 * | 3/2001 | LaVite | B60R 13/005 343/720 |
| 6,357,899 B1 | 3/2002 | Craven | |
| 6,883,945 B1 * | 4/2005 | Gonzalez | B60Q 1/2661 362/485 |
| D531,095 S * | 10/2006 | Murguia | D12/162 |
| 7,347,597 B2 * | 3/2008 | French | B60D 1/60 280/164.1 |
| 8,286,987 B2 * | 10/2012 | Campbell | B60D 1/60 280/507 |
| 8,537,561 B1 * | 9/2013 | Strout | B60S 1/0491 116/54 |
| 8,550,487 B2 * | 10/2013 | Fox | B60D 1/60 280/507 |
| 9,434,225 B1 * | 9/2016 | Corsaut | B60D 1/64 |
| 2010/0109287 A1 * | 5/2010 | MacDougall | G09F 7/20 280/491.1 |

(Continued)

FOREIGN PATENT DOCUMENTS

WO 03033285 A2 5/2004

*Primary Examiner* — Zhen Y Wu
(74) *Attorney, Agent, or Firm* — Kyle A. Fletcher, Esq.

(57) ABSTRACT

The trailer hitch signaling device is a visual signaling device. The trailer hitch signaling device is configured for use with a vehicle. The vehicle is further defined with a hitch. The trailer hitch signaling device is configured to attach to the hitch. The trailer hitch signaling device physically moves to indicate an action selected from the group consisting of: 1) the vehicle is braking; 2) the vehicle is preparing to turn left; and, 3) the vehicle is preparing to turn right. The trailer hitch signaling device further comprises a lamp. The lamp generates illumination to further signal that the vehicle is braking. The trailer hitch signaling device comprises the puppet and a control circuit. The control system is contained within the puppet. The control system is electrically connected to the vehicle. The control system further moves the limbs of the puppet and illuminates the lamp.

18 Claims, 7 Drawing Sheets

(56) References Cited

U.S. PATENT DOCUMENTS

| | | | |
|---|---|---|---|
| 2011/0167688 A1* | 7/2011 | Frost | G09F 21/04 |
| | | | 40/541 |
| 2012/0057361 A1* | 3/2012 | Corliss | B60Q 1/2661 |
| | | | 362/485 |
| 2012/0151810 A1* | 6/2012 | Campbell | B60D 1/60 |
| | | | 40/414 |
| 2015/0043231 A1* | 2/2015 | Clark | G09F 21/048 |
| | | | 362/485 |
| 2016/0347247 A1* | 12/2016 | Espey | B60Q 1/2657 |
| 2017/0057312 A1* | 3/2017 | Baron | B60D 1/06 |
| 2017/0326931 A1* | 11/2017 | Batiste | B60D 1/605 |
| 2017/0361836 A1* | 12/2017 | Lavoie | B60W 30/06 |

* cited by examiner

TRAILER HITCH SIGNALING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including vehicles and inter-vehicle connections, more specifically, an auxiliary device for a hitch.

SUMMARY OF INVENTION

The trailer hitch signaling device is a visual signaling device. The trailer hitch signaling device is configured for use with a vehicle. The vehicle is further defined with a hitch. The trailer hitch signaling device is configured to attach to the hitch. The trailer hitch signaling device physically moves to indicate an action selected from the group consisting of: 1) the vehicle is braking; 2) the vehicle is preparing to turn left; and, 3) the vehicle is preparing to turn right. The trailer hitch signaling device further comprises a lamp. The lamp generates illumination to further signal that the vehicle is braking. The trailer hitch signaling device comprises the puppet and a control circuit. The control system is contained within the puppet. The control system is electrically connected to the vehicle. The control system further moves the limbs of the puppet and illuminates the lamp.

It is a further object of the invention for the limbs of the puppet to include lamps of an amber hue on distal ends, which illuminate with the corresponding turn signal of the vehicle.

These together with additional objects, features and advantages of the trailer hitch signaling device will be readily apparent to those of ordinary skill in the art upon reading the following detailed description of the presently preferred, but nonetheless illustrative, embodiments when taken in conjunction with the accompanying drawings.

In this respect, before explaining the current embodiments of the trailer hitch signaling device in detail, it is to be understood that the trailer hitch signaling device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the trailer hitch signaling device.

It is therefore important that the claims be regarded as including such equivalent construction insofar as they do not depart from the spirit and scope of the trailer hitch signaling device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
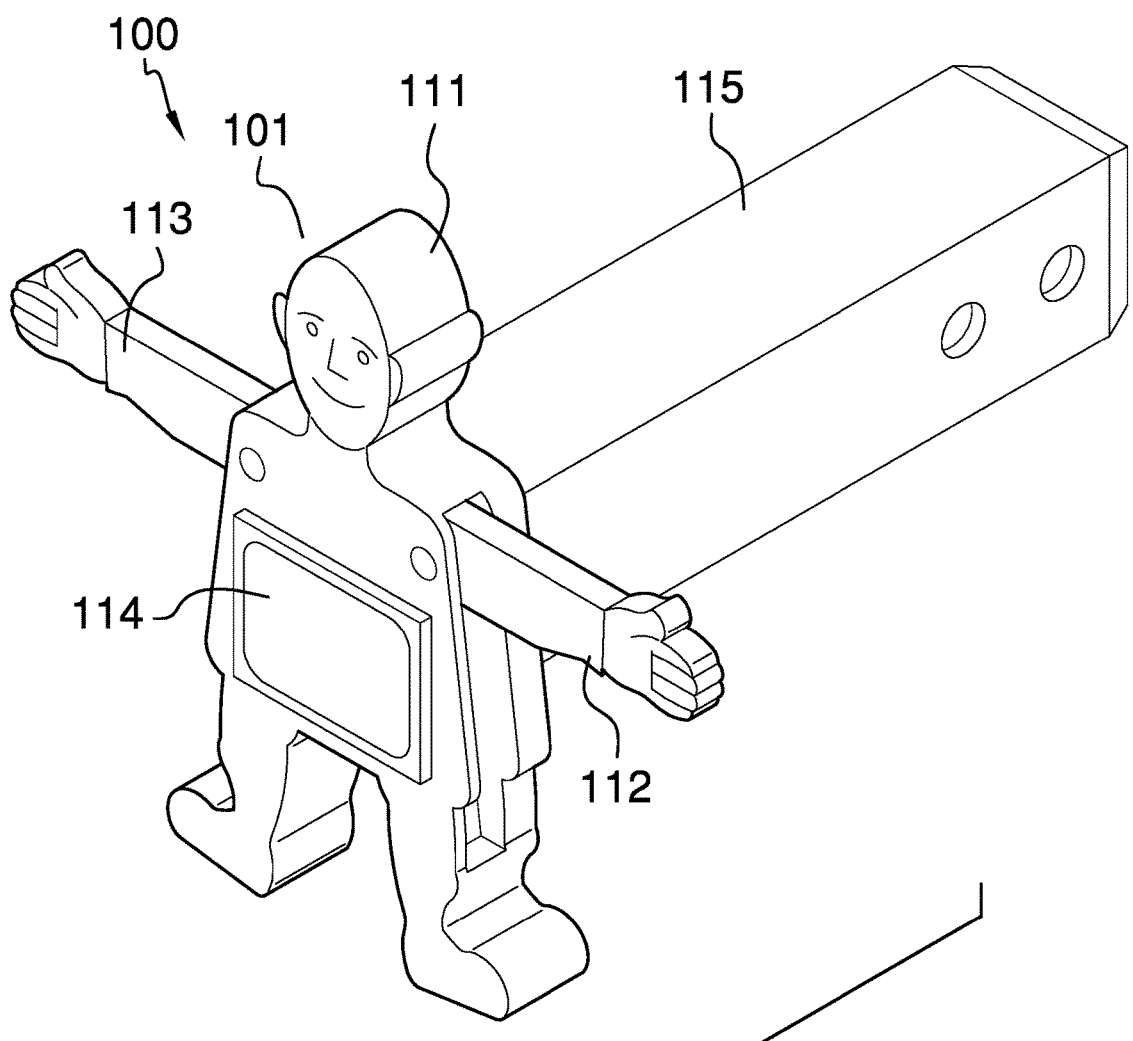
FIG. 1 is a perspective view of an embodiment of the disclosure.
Figure 2:
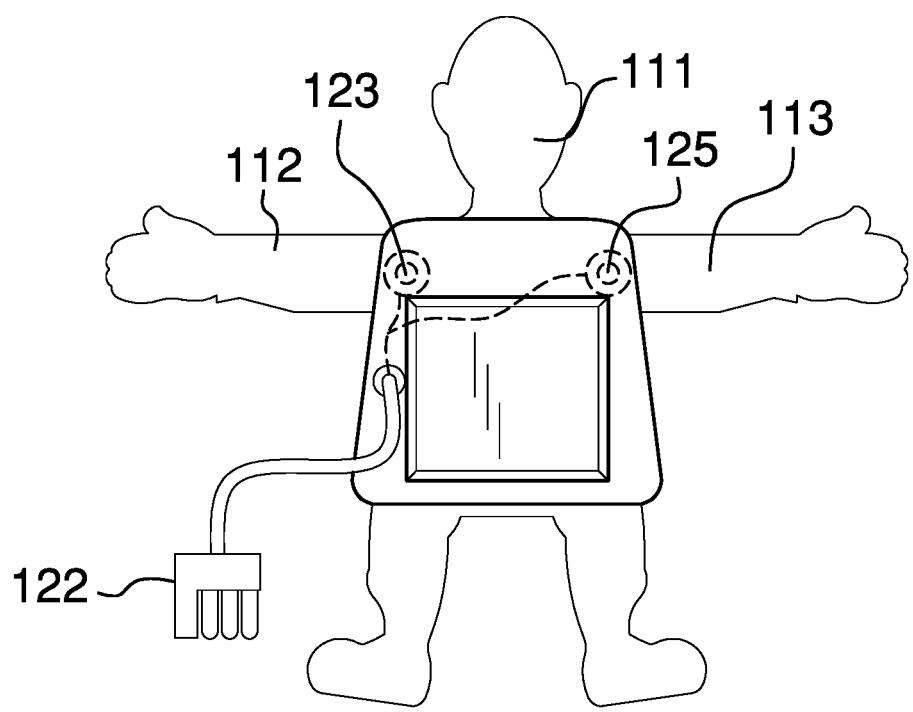
FIG. 2 is a rear view of an embodiment of the disclosure.
Figure 3:
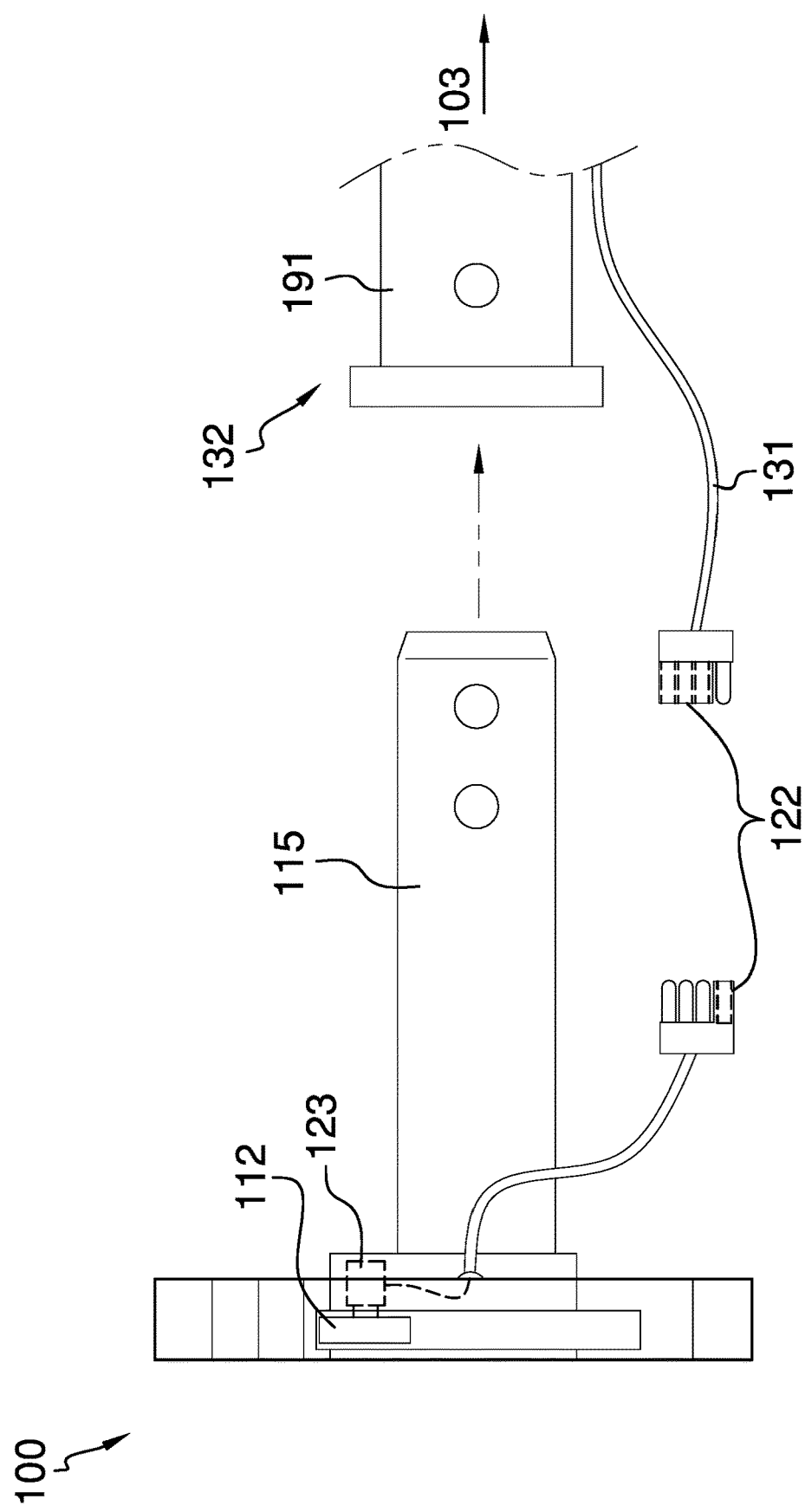
FIG. 3 is a side view of an embodiment of the disclosure.
Figure 4:
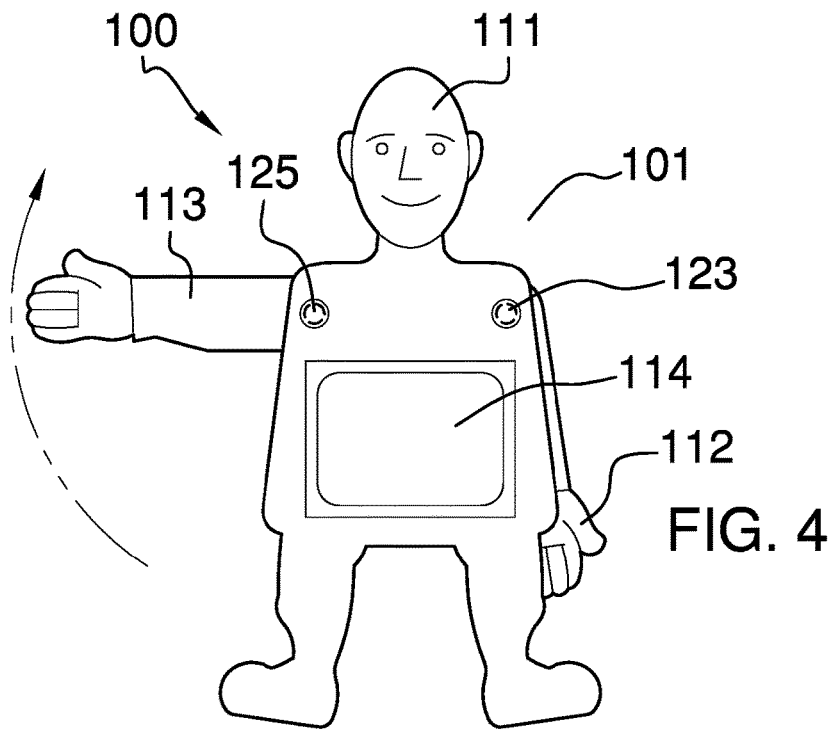
FIG. 4 is a detail view of an embodiment of the disclosure.
Figure 5:
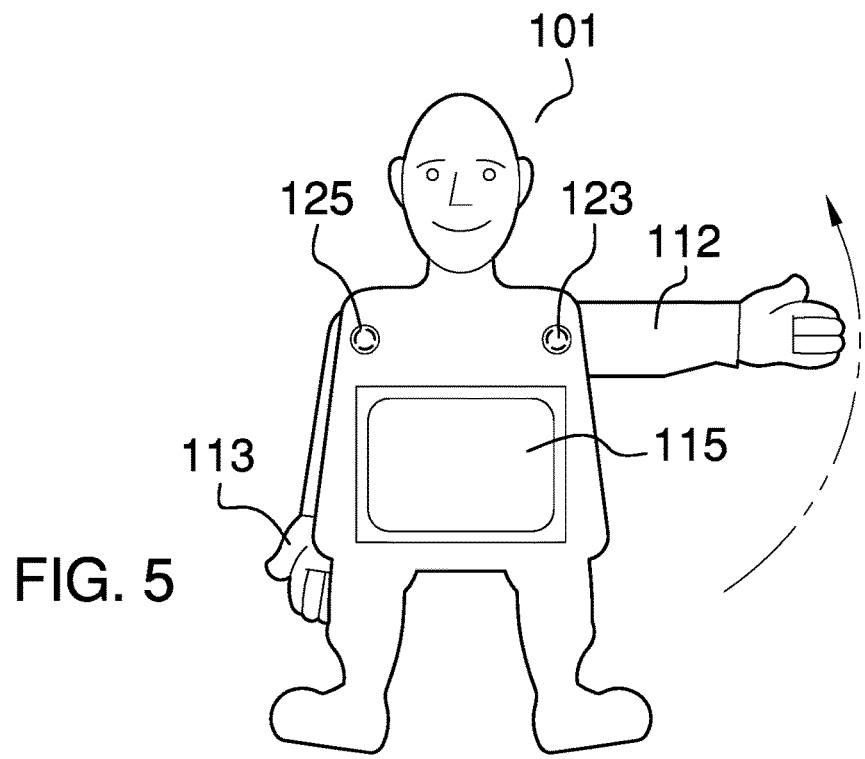
FIG. 5 is a detail view of an embodiment of the disclosure.
Figure 6:
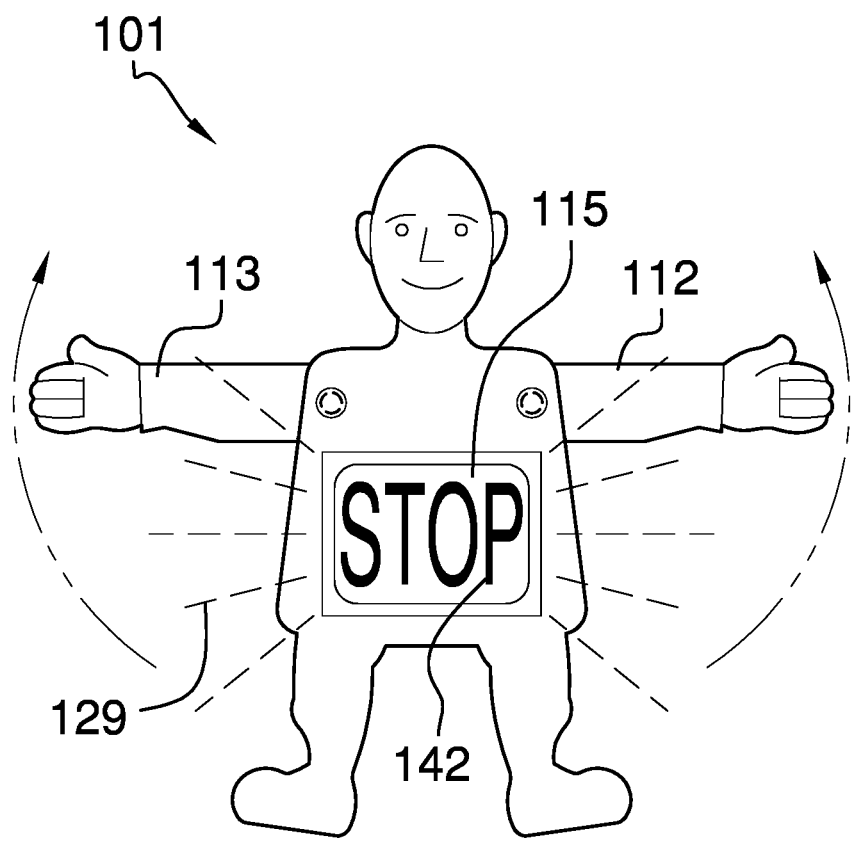
FIG. 6 is a front view of an embodiment of the disclosure.
Figure 7:
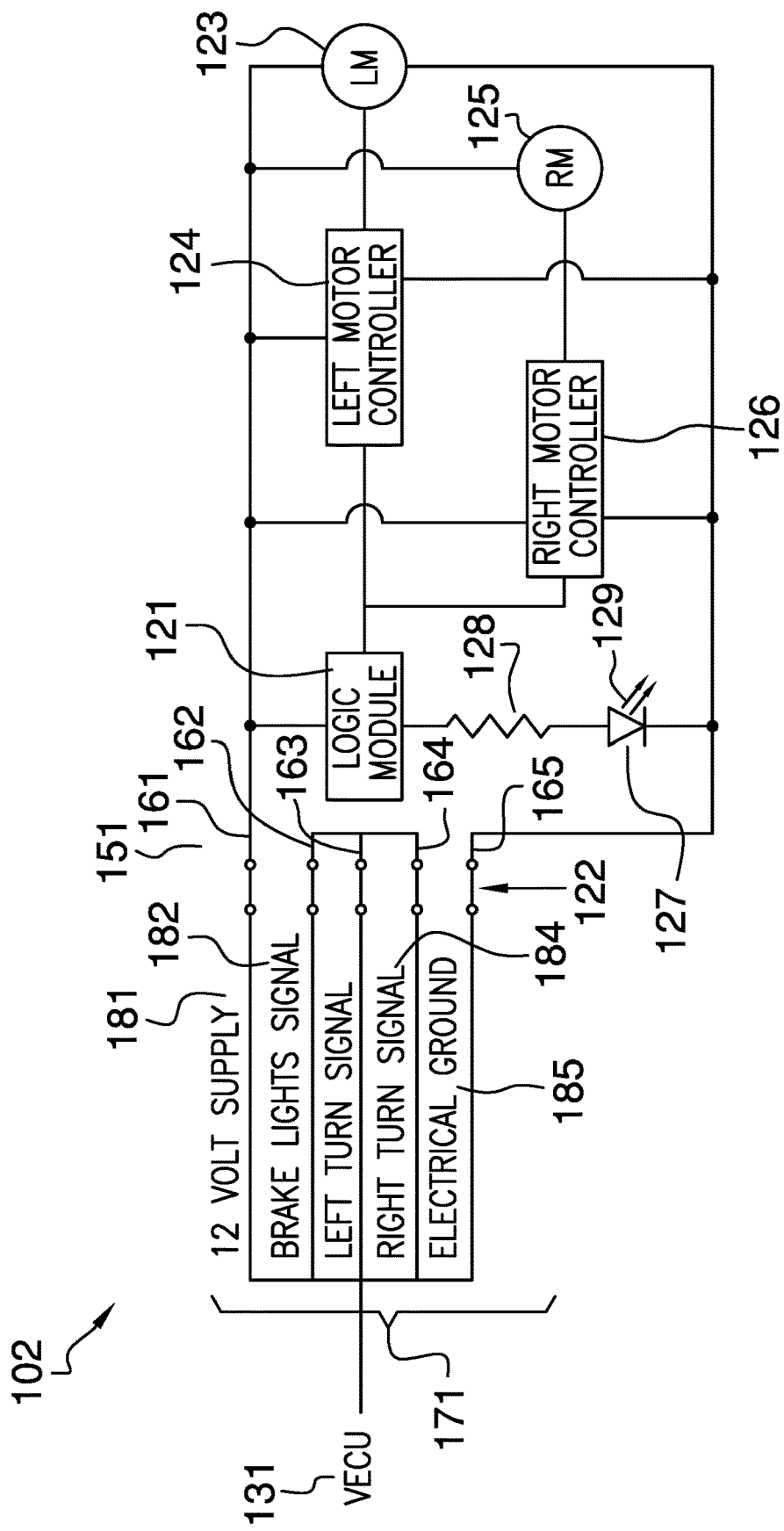
FIG. 7 is a block diagram of an embodiment of the disclosure.
Figure 8:
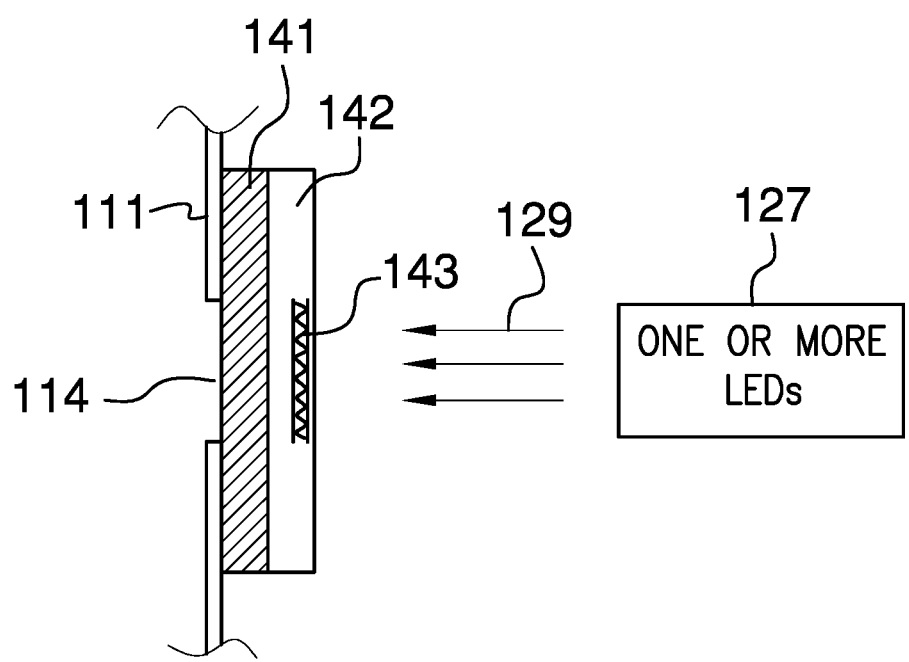
FIG. 8 is a detail view of an embodiment of the disclosure.

Detailed reference will now be made to one or more potential embodiments of the disclosure, which are illustrated in FIGS. 1 through 8.

The trailer hitch signaling device 100 (hereinafter invention) is a visual signaling device. The invention 100 is configured for use with a vehicle 103. The vehicle 103 is further defined with a hitch 132. The invention 100 is configured to attach to the hitch 132. The invention 100 physically moves to indicate an action selected from the group consisting of: 1) the vehicle 103 is braking; 2) the vehicle 103 is preparing to turn left; and, 3) the vehicle 103 is preparing to turn right. The invention 100 further comprises a lamp. The lamp generates illumination 129 to further signal that the vehicle 103 is braking. The invention 100 comprises the puppet 101 and a control circuit 102. The puppet contains the control circuit 102. The control circuit 102 electrically connects to the vehicle 103. The control circuit 102 further moves the limbs of the puppet 101 and controls the illumination 129 from the lamp.

The vehicle 103 is a commercially available motorized device. Suitable vehicles 103 include, but are not limited to, an automobile. The vehicle 103 and the automobile are defined in greater detail elsewhere in this disclosure. The vehicle 103 further comprises a vehicle engine control unit 131 and a hitch 132.

The vehicle engine control unit 131 refers to the electrical power and electrical control system of the vehicle 103. The vehicle engine control unit 131 further comprises a plurality of connections 171. The vehicle engine control unit 131 provides the plurality of connections 171 to the control circuit 102. The plurality of connections 171 comprises a 12 volt supply 181, a brake light signal 182, a left turn signal 183, a right turn signal 184, and an electrical ground 185.

Each of the plurality of connections 171 is an electrical facility provided to the control circuit 102 by the vehicle engine control unit 131. The 12 volt supply 181 is a connection to the 12 Volt DC supply that powers the electrical systems of the vehicle 103. The brake light signal 182 is a control signal indicating the brakes of the vehicle 103 have been activated. The brake light signal 182 is monitored by the logic module 121. The left turn signal 183 is a control signal indicating the left turn signal 183 of the vehicle 103 has been activated. The left turn signal 183 is monitored by the logic module 121. The right turn signal 184 is a control signal indicating the right turn signal 183 of the vehicle 103 has been activated. The right turn signal 184 is monitored by the logic module 121. The electrical ground 185 is a connection to the electrical ground 185 provided by the DC power system used by the vehicle 103.

The hitch 132 is a well-known and documented connecting device. The hitch 132 is traditionally used to attach a trailer to the vehicle 103. The attachment of the invention 100 to the hitch 132 is appropriate when the hitch 132 is not attached to the trailer. The method of attaching of the invention 100 to the vehicle 103 is identical to the method of attachment of the trailer to the vehicle 103. The hitch 132 further comprises a hitch 132 receiver 191. The hitch 132 receiver 191 is a hollow prism-shaped structure. The hitch 132 receiver 191 is geometrically similar to the hitch 132 ferrule 115 such that the hitch 132 ferrule 115 inserts into the hitch 132 receiver 191 for attachment.

The puppet 101 is a sculpture formed with movable limbs. The puppet 101 is formed in the image of a person. The movable limbs of the puppet 101 are moved by the control circuit 102. The puppet 101 attaches to the vehicle 103. The puppet 101 provides optical signals that supplement the traffic control signals typically provisioned with a vehicle 103. The puppet 101 comprises a figurine 111, a display aperture 114, and a hitch 132 ferrule 115.

The figurine 111 forms the physical base of the invention 100. The figurine 111 is formed to represent the shape of the head, torso, and legs of a person.

The figurine 111 further comprises a left arm 112 and a right arm 113. The left arm 112 is a structure that is formed to represent the left arm 112 of a person. The left arm 112 attaches to the figurine 111 through the control circuit 102. The left arm 112 attaches to the control circuit 102 such that the left arm 112 rotates. The control circuit 102 controls the rotation of the left arm 112. The right arm 113 is a structure that is formed to represent the right arm 113 of a person. The right arm 113 attaches to the figurine 111 through the control circuit 102. The right arm 113 attaches to the control circuit 102 such that the right arm 113 rotates. The control circuit 102 controls the rotation of the right arm 113.

The display aperture 114 is an opening formed in the torso of the figurine 111. The display aperture 114 allows the illumination 129 generated by the control circuit 102 to escape the figurine 111 in a visible manner. The display aperture 114 has a rectangular shape. The display aperture 114 further comprises a red filter 141 and a gobo 142. The gobo 142 further comprises a stencil 143.

The red filter 141 is a red transparent structure placed over the display aperture 114. The red filter 141 converts the illumination 129 generated by the one or more LEDs 127 to a red hue consistent with traffic laws. The gobo 142 is a device that blocks a portion of the illumination 129 generated by the one or more LEDs 127 from passing through the red filter 141 and the display aperture 114. The gobo 142 generates a text-based pattern indicating that the brakes of the vehicle 103 are in use. The text-based pattern generated by the gobo 142 is created by the stencil 143. The pattern created by the stencil 143 generates the text-based message "STOP". The gobo 142 is positioned between the red filter 141 and the one or more LEDs 127.

The hitch 132 ferrule 115 is a prism-shaped structure attached to the surface of the figurine 111 that is distal from the surface of the figurine 111 that contains the display aperture 114. The hitch 132 ferrule 115 projects perpendicularly away from the figurine 111. The hitch 132 ferrule 115 attaches the figurine 111 to the vehicle 103. The hitch 132 ferrule 115 is further defined with an outer diameter. The span of the outer diameter of the hitch 132 ferrule 115 is less than the span of the inner diameter of the hitch 132 receiver 191 such that the hitch 132 ferrule 115 inserts into the hitch 132 receiver 191. The puppet 101 attaches to the vehicle 103 by inserting the hitch 132 ferrule 115 into the hitch 132 receiver 191.

The control circuit 102 is a programmable electrical device. The puppet 101 contains the control circuit 102. The control circuit 102: 1) receives a control signal from the vehicle 103; 2) converts the received control signal into an action selected from the group consisting of: a) moving one or more limbs of the puppet 101; b) generating an illumination 129 used to display a traffic control signal; and, c) a combination of the actions previously described in (a) and (b) of this sentence. The control circuit 102 comprises a logic module 121, a wiring harness 122, a left motor 123, a right motor 125, a one or more LEDs 127, and a limit resistor 128.

The logic module 121 is a readily and commercially available programmable electronic device that is used to manage, regulate, and operate the control circuit 102. Methods to design and use a logic module 121 for the purpose described in this disclosure are well-known and documented in the electrical arts.

The logic module 121 receives a control signal from the vehicle engine control unit 131 selected from the group consisting of the brake light signal 182, the left turn signal 183, and the right turn signal 184.

Based on the selected control signal received, the logic module 121 will perform an action selected from the group consisting of: a) rotating the right arm 113 between a position of pointing to the ground and a position of pointing towards the left side of the vehicle 103; b) rotating the left arm 112 between a position of pointing to the ground and a position of pointing towards the left side of the vehicle 103; and, c) simultaneously rotating both the left arm 112 and the right arm 113 in a cyclic fashion while simultaneously generating illumination 129 through the display aperture 114. The logic module 121 draws electrical power from the vehicle engine control unit 131 of the vehicle 103 through the 12 volt lead 161.

The wiring harness 122 is a commercially available electrical connector that electrically connects the control circuit 102 to the vehicle engine control unit 131 of the vehicle 103. The wiring harness 122 provides the control circuit 102 with a plurality of connections 171 that: a) provide control signals for use by the logic module 121; and, 2) provides the electrical power necessary to operate the control circuit 102. The wiring harness 122 further comprises a plurality of input leads 151. The plurality of input leads 151 comprises a 12 volt lead 161, a brake light signal lead 162, a left turn signal lead 163, a right turn signal lead 164, and an electrical ground lead 165.

The plurality of input leads 151 comprises a plurality of electrical connection between the plurality of connections 171 and the electrical elements within the control circuit 102. The plurality of input leads 151 attach to the plurality of connections 171 using the wiring harness 122.

The 12 volt lead 161 electrically connects to the 12 volt supply 181 using the wiring harness 122. The 12 volt lead 161 electrically connects to the logic module 121. The 12 volt lead 161 electrically connects to the left motor 123. The 12 volt lead 161 electrically connects to the left motor controller 124. The 12 volt lead 161 electrically connects to the right motor 125. The 12 volt lead 161 electrically connects to the right motor controller 126.

The brake light signal lead 162 electrically connects to the brake light signal 182 using the wiring harness 122. The brake light signal lead 162 electrically connects to the logic module 121.

The left turn signal lead 163 electrically connects to the left turn signal 183 using the wiring harness 122. The left turn signal lead 163 electrically connects to the logic module 121.

The right turn signal lead 164 electrically connects to the right turn signal 184 using the wiring harness 122. The right turn signal lead 164 electrically connects to the logic module 121.

The electrical ground lead 165 electrically connects to the electrical ground 185 using the wiring harness 122. The electrical ground lead 165 electrically connects to the logic module 121. The electrical ground lead 165 electrically connects to the left motor 123. The electrical ground lead 165 electrically connects to the left motor controller 124. The electrical ground lead 165 electrically connects to the right motor 125. The electrical ground lead 165 electrically connects to the right motor controller 126. The electrical ground lead 165 electrically connects to the one or more LEDs 127.

The left motor 123 is a commercially available servo motor. The left arm 112 attaches to the left motor 123 such that the rotation of the left motor 123 will rotate the left arm 112. The left motor 123 further comprises a left motor controller 124. The left motor 123 is operated using the left motor controller 124. The left motor 123 is powered from the 12 volt lead 161 of the wiring harness 122. The left motor controller 124 is an electrical circuit that controls the angular position of the left motor 123. The left motor controller 124 is powered by the 12 volt lead 161 of the wiring harness 122. The left motor controller 124 is directly controlled by the logic module 121.

The right motor 125 is a commercially available servo motor. The right arm 113 attaches to the right motor 125 such that the rotation of the right motor 125 will rotate the right arm 113. The right motor 125 further comprises a right motor controller 126. The right motor 125 is operated using the right motor controller 126. The right motor 125 is powered by the 12 volt lead 161 of the wiring harness 122. The right motor controller 126 is an electrical circuit that controls the angular position of the right motor 125. The right motor controller 126 is powered by the 12 volt lead 161 of the wiring harness 122. The right motor controller 126 is directly controlled by the logic module 121.

The one or more LEDs 127 is an electrical device that generates illumination 129. The logic module 121 controls the operation of the one or more LEDs 127. The illumination 129 generated using the one or more LEDs 127 is passed through the red filter 141, the gobo 142, and the display aperture 114 to generate an illuminated text message indicating the brakes of the vehicle 103 are in use. The limit resistor 128 is an electrical device that limits the amount of electric current passing through the one or more LEDs 127. The illumination 129 refers to light that is used to illuminate a text-based message contained within the gobo 142.

This paragraph describes the operation of the control circuit 102. When the brake light signal 182 is activated, the logic module 121 simultaneously rotates both the left arm 112 and the right arm 113 in a cyclic fashion while also simultaneously generating illumination 129 through the display aperture 114. When the left turn signal 183 is activated, the logic module 121 rotates the right arm 113 between a position of pointing to the ground and a position of pointing towards the left side of the vehicle 103. When the right turn signal 184 is activated, the logic module 121 rotates the left arm 112 between a position of pointing to the ground and a position of pointing towards the left side of the vehicle 103.

The following definitions were used in this disclosure:

Automobile: As used in this disclosure, an automobile is a road vehicle that specializes in carrying passengers and light cargo loads. This definition is specifically intended to include vehicles generally referred to as pickup trucks, vans, minivans, and sport utility vehicles.

Correspond: As used in this disclosure, the term correspond is used as a comparison between two or more objects wherein one or more properties shared by the two or more objects match, agree, or align within acceptable manufacturing tolerances.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage used in the design and implementation of electrical circuits. An electrical ground is often, but not necessarily, the discharge point of electric currents flowing through an electric circuit.

Electric Motor: In this disclosure, an electric motor is a machine that converts electric energy into rotational mechanical energy.

Ferrule: As used in this disclosure, a ferrule is a prism-shaped device that inserts into the end of a prism-shaped structure such that the center axis of the prism-shaped device is aligned center axis of the prism-shaped structure. The outer diameter of the prism-shaped device is lesser than the outer diameter of the prism-shaped structure. Objects attached to the prism-shaped device are thereby attached to the prism-shaped structure.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Gobo: As used in this disclosure, a gobo is a structure that controls the pattern of light generated by a light source. The gobo is placed between the light source and a target surface. The gobo forms a stencil that blocks a portion of the light generated by the light source as the generated light passes through the gobo to the target surface thereby forming the pattern.

Hitch: As used in this disclosure, a hitch is a fastening apparatus that attaches an unpowered vehicle, such as a trailer, to a motorized vehicle such that the motorized vehicle can tow the unpowered vehicle.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lamp: As used in this disclosure, a lamp is an electrical device that generates visible light to illuminate objects so they can be seen.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs which are used to determine the desired rotational speed and direction of rotation of the electric motor.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Puppet: As used in this disclosure, a puppet is a FIG. resembling a human, animal or symbolic image that can be moved and used for entertainment or educational purposes.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Servo Motor: As used in this disclosure, a servo motor is an electrical motor that further incorporates a feedback circuit that allows for the precise angular positioning of the electric motor. Include Feedback Trailer: As used in this disclosure, a trailer is an unpowered wheeled vehicle that is towed by a powered vehicle such as a tractor.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A signaling device mounted on a trailer hitch comprising:
 a puppet, a control circuit, and a lamp;
 wherein the puppet contains the control circuit;
 wherein the control circuit moves the puppet and controls the illumination from the lamp;
 wherein the signaling device mounted on a trailer hitch of a vehicle;
 wherein the control circuit electrically connects to a vehicle engine control unit of the vehicle;
 wherein the vehicle engine control unit further comprises a plurality of connections;

wherein each of the plurality of connections is an electrical facility provided to the control circuit by the vehicle engine control unit;

wherein the plurality of connections comprises a 12 volt supply, a brake light signal, a left turn signal, a right turn signal, and an electrical ground;

wherein the 12 volt supply is a connection to a 12 volt direct current supply that powers the electrical systems of the vehicle;

wherein the brake light signal is a control signal indicating the brakes of the vehicle have been activated;

wherein the left turn signal is a control signal indicating the left turn signal of the vehicle has been activated;

wherein the right turn signal is a control signal indicating the right turn signal of the vehicle has been activated;

wherein the electrical ground is a connection to the electrical ground provided by the dc power system used by the vehicle, wherein the signaling device physically controls the movement of a one or more moveable limbs of the puppet to indicate a direction the vehicle is preparing to turn based on the left turn signal or the right turn signal; and wherein the signaling device generates illumination from the lamp to signal the vehicle is braking based on the brake light signal.

2. The signaling device mounted on a trailer hitch according to claim 1,
wherein the puppet is a sculpture;
wherein the puppet is formed in an image of a person;
wherein the one or more moveable limbs of the puppet are moved by the control circuit.

3. The signaling device mounted on a trailer hitch according to claim 2,
wherein the control circuit is a programmable electrical device;
wherein the control circuit converts the received control signal into a first action of moving one or more movable limbs of the puppet;
wherein the control circuit converts the received control signal into a second action of generating an illumination used to display a traffic control signal;
wherein the control circuit converts the received control signal into a third action of simultaneously performing the first action and the second action.

4. The signaling device mounted on a trailer hitch according to claim 3,
wherein the brake light signal is monitored by a logic module;
wherein the left turn signal is monitored by the logic module;
wherein the right turn signal is monitored by the logic module.

5. The signaling device mounted on a trailer hitch according to claim 4,
wherein the hitch is a connecting device;
wherein the signaling device attaches to the hitch;
wherein the hitch further comprises a hitch receiver;
wherein the hitch receiver is a hollow prism-shaped structure.

6. The signaling device mounted on a trailer hitch according to claim 5,
wherein the puppet comprises a figurine, a display aperture, and a hitch ferrule;
wherein the display aperture is formed in the figurine;
wherein the hitch ferrule attaches to the figurine;
wherein the figurine is formed to represent the shape of a head, a torso, and a legs of a person.

7. The signaling device mounted on a trailer hitch according to claim 6,
wherein the figurine further comprises a left arm and a right arm;
wherein the left arm attaches to the figurine through the control circuit;
wherein the right arm attaches to the figurine through the control circuit;
wherein the left arm attaches to the control circuit such that the left arm rotates;
wherein the right arm attaches to the control circuit such that the right arm rotates.

8. The signaling device mounted on a trailer hitch according to claim 7,
wherein the control circuit controls the rotation of the left arm;
wherein the control circuit controls the rotation of the right arm.

9. The signaling device mounted on a trailer hitch according to claim 8,
wherein the display aperture allows the illumination generated by the control circuit to escape the figurine;
wherein the display aperture has a rectangular shape;
wherein the display aperture further comprises a red filter and a gobo;
wherein the gobo further comprises a stencil;
wherein the red filter is a red transparent structure placed over the display aperture;
wherein the red filter converts the illumination generated by the control circuit to a red hue consistent with traffic laws;
wherein the gobo is a device that blocks a portion of the illumination generated by the control circuit from passing through the red filter and the display aperture;
wherein the gobo generates a text-based pattern indicating that the brakes of the vehicle are in use; wherein the text-based pattern generated by the gobo is created by the stencil;
wherein the pattern created by the stencil generates the text-based message "STOP".

10. The signaling device mounted on a trailer hitch according to claim 9,
wherein the hitch ferrule is a prism-shaped structure attached to a surface of the figurine that is distal from the surface of the figurine that contains the display aperture;
wherein the hitch ferrule projects perpendicularly away from the figurine;
wherein the hitch ferrule is further defined with an outer diameter;
wherein the hitch receiver is geometrically similar to the hitch;
wherein the span of the outer diameter of the hitch ferrule is less than the span of the inner diameter of the hitch receiver such that the hitch ferrule inserts into the hitch receiver;
wherein the puppet attaches to the vehicle by inserting the hitch ferrule into the hitch receiver.

11. The signaling device mounted on a trailer hitch according to claim 10,
wherein the control circuit comprises the logic module, a wiring harness, a left motor, a right motor, a one or more light emitting diodes (LEDs), and a limit resistor;

wherein the logic module, the wiring harness, the left motor, the right motor, the one or more light emitting diodes LEDs, and the limit resistor are electrically interconnected.

12. The signaling device mounted on a trailer hitch according to claim 11,
wherein the logic module is a programmable electronic;
wherein the logic module receives a control signal from the vehicle engine control unit selected from the group consisting of the brake light signal, the left turn signal, and the right turn signal;
wherein the logic module rotates the right arm between a position of pointing to the ground and a position of pointing towards a left side of the vehicle;
wherein the logic module rotates the left arm between a position of pointing to the ground and a position of pointing towards a left side of the vehicle;
wherein the logic module simultaneously rotates both the left arm and the right arm in a cyclic fashion;
wherein the logic module controls the illumination that passes through the display aperture.

13. The signaling device mounted on a trailer hitch according to claim 12,
wherein the wiring harness is an electrical connector;
wherein the wiring harness electrically connects the control circuit to the vehicle engine control unit;
wherein the wiring harness further comprises a plurality of input leads;
wherein the plurality of input leads comprises a plurality of electrical connections between the plurality of connections and a plurality of electrical elements within the control circuit;
wherein the plurality of input leads attach to the plurality of connections through the wiring harness.

14. The signaling device mounted on a trailer hitch according to claim 13,
wherein the plurality of input leads comprises a 12 volt lead, a brake light signal lead, a left turn signal lead, a right turn signal lead, and an electrical ground lead;
wherein the 12 volt lead electrically connects to the 12 volt supply using the wiring harness;
wherein the 12 volt lead electrically connects to the logic module;
wherein the 12 volt lead electrically connects to the left motor;
wherein the 12 volt lead electrically connects to a left motor controller;
wherein the 12 volt lead electrically connects to the right motor;
wherein the 12 volt lead electrically connects to a right motor controller;
wherein the brake light signal lead electrically connects to the brake light signal using the wiring harness;
wherein the brake light signal lead electrically connects to the logic module;
wherein the left turn signal lead electrically connects to the left turn signal using the wiring harness;
wherein the left turn signal lead electrically connects to the logic module;
wherein the right turn signal lead electrically connects to the right turn signal using the wiring harness;
wherein the right turn signal lead electrically connects to the logic module;
wherein the electrical ground lead electrically connects to the electrical ground using the wiring harness;
wherein the electrical ground lead electrically connects to the logic module;
wherein the electrical ground lead electrically connects to the left motor;
wherein the electrical ground lead electrically connects to the left motor controller;
wherein the electrical ground lead electrically connects to the right motor;
wherein the electrical ground lead electrically connects to the right motor controller;
wherein the electrical ground lead electrically connects to the one or more LEDs.

15. The signaling device mounted on a trailer hitch according to claim 14,
wherein the left motor is a servo motor;
wherein the left arm attaches to the left motor such that the rotation of the left motor will rotate the left arm;
wherein the left motor further comprises the left motor controller;
wherein the left motor is operated using the left motor controller;
wherein the left motor controller is an electrical circuit that controls the angular position of the left motor;
wherein the left motor controller is directly controlled by the logic module;
wherein the right motor is a servo motor;
wherein the right arm attaches to the right motor such that the rotation of the right motor will rotate the right arm;
wherein the right motor further comprises the right motor controller;
wherein the right motor is operated using the right motor controller;
wherein the right motor controller is an electrical circuit that controls the angular position of the right motor;
wherein the right motor controller is directly controlled by the logic module.

16. The signaling device mounted on a trailer hitch according to claim 15,
wherein each of the one or more LEDs is an electrical device;
wherein each of the one or more LEDs generates illumination;
wherein the logic module controls the operation of the one or more LEDs;
wherein the limit resistor is an electrical device that limits the amount of electric current passing through the one or more LEDs.

17. The signaling device mounted on a trailer hitch according to claim 16,
wherein the illumination generated using the one or more LEDs is passed through the red filter, the gobo, and the display aperture;
wherein the gobo is positioned between the red filter and the one or more LEDs.

18. The signaling device mounted on a trailer hitch according to claim 17,
wherein when the brake light signal is activated, the logic module simultaneously rotates both the left arm and the right arm in a cyclic fashion while also simultaneously generating illumination through the display aperture;
wherein when the left turn signal is activated, the logic module rotates the right arm between a position of pointing to the ground and a position of pointing towards the left side of the vehicle;
wherein when the right turn signal is activated, the logic module rotates the left arm between a position of pointing to the ground and a position of pointing towards the left side of the vehicle.

* * * * *